United States Patent
Parepally

(10) Patent No.: US 10,769,222 B2
(45) Date of Patent: Sep. 8, 2020

(54) SEARCH RESULT RANKING BASED ON POST CLASSIFIERS ON ONLINE SOCIAL NETWORKS

(71) Applicant: Facebook, Inc., Menlo Park, CA (US)

(72) Inventor: Sai Nishanth Parepally, Newark, CA (US)

(73) Assignee: Facebook, Inc., Menlo Park, CA (US)

( * ) Notice: Subject to any disclaimer, the term of this patent is extended or adjusted under 35 U.S.C. 154(b) by 617 days.

(21) Appl. No.: 15/463,751

(22) Filed: Mar. 20, 2017

(65) Prior Publication Data
US 2018/0268065 A1    Sep. 20, 2018

(51) Int. Cl.
  *G06F 16/9535*  (2019.01)
  *G06N 20/00*    (2019.01)
  *G06F 16/248*   (2019.01)
  *G06F 16/2457*  (2019.01)
  *G06F 16/33*    (2019.01)

(52) U.S. Cl.
  CPC ........ *G06F 16/9535* (2019.01); *G06F 16/248* (2019.01); *G06F 16/24578* (2019.01); *G06F 16/334* (2019.01); *G06N 20/00* (2019.01)

(58) Field of Classification Search
  None
  See application file for complete search history.

(56) References Cited

U.S. PATENT DOCUMENTS

| | | | |
|---|---|---|---|
| 5,918,014 A | 6/1999 | Robinson | |
| 6,539,232 B2 | 3/2003 | Hendrey | |
| 6,957,184 B2 | 10/2005 | Schmid | |
| 7,069,308 B2 | 6/2006 | Abrams | |
| 7,379,811 B2 | 5/2008 | Rasmussen | |
| 7,539,697 B1 | 5/2009 | Akella | |
| 7,752,326 B2 | 7/2010 | Smit | |
| 7,783,630 B1 | 8/2010 | Chevalier | |
| 7,797,635 B1 | 9/2010 | Denise | |
| 7,836,044 B2 | 11/2010 | Kamvar | |
| 7,840,589 B1 | 11/2010 | Holt | |
| 8,024,328 B2 | 9/2011 | Dolin | |
| 8,027,990 B1 | 9/2011 | Mysen | |
| 8,055,673 B2 | 11/2011 | Churchill | |
| 8,060,639 B2 | 11/2011 | Smit | |
| 8,082,278 B2 | 12/2011 | Agrawal | |
| 8,112,529 B2 | 2/2012 | Van Den Oord | |
| 8,135,721 B2 | 3/2012 | Joshi | |
| 8,145,636 B1 | 3/2012 | Jeh | |

(Continued)

OTHER PUBLICATIONS

U.S. Appl. No. 15/286,315, filed Oct. 5, 2016, Green.
U.S. Appl. No. 15/365,789, filed Nov. 30, 2016, Wang.

*Primary Examiner* — Uyen T Le
(74) *Attorney, Agent, or Firm* — Jordan IP Law, LLC

(57) ABSTRACT

In one embodiment, a method includes generating a reconstructed embedding of a query based on one or more term embeddings associated with the one or more query terms, respectively, on receiving a query with the one or more query terms, formulating an evaluation model based at least on the reconstructed embedding of the query, where the evaluation model calculates a relevance score for posts with respect to the search query based at least on the classifier vectors of the posts, and calculating, for each of the retrieved posts, a relevance score for the post by applying the associated classifier vector to the formulated evaluation model.

19 Claims, 9 Drawing Sheets

(56) References Cited

U.S. PATENT DOCUMENTS

| | | |
|---|---|---|
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 9,672,555 B1 * | 6/2017 | Dillard ............... G06Q 30/0631 |
| 10,311,117 B2 * | 6/2019 | Stoyanov ............ H04L 67/306 |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2006/0218111 A1 | 9/2006 | Cohen |
| 2007/0174304 A1 | 7/2007 | Shrufi |
| 2007/0192293 A1 | 8/2007 | Swen |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0222348 A1 | 9/2009 | Ransom |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0271374 A1 | 10/2009 | Korn |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0250526 A1 | 9/2010 | Prochazka |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179922 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |

(56) References Cited

U.S. PATENT DOCUMENTS

| | | |
|---|---|---|
| 2013/0254155 A1 | 9/2013 | Thollot |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0280080 A1 | 9/2014 | Solheim |
| 2014/0304429 A1 | 10/2014 | Softky |
| 2015/0074289 A1 | 3/2015 | Hyman |
| 2015/0161519 A1 | 6/2015 | Zhong |
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1 | 2/2016 | He |
| 2016/0042067 A1 | 2/2016 | Weng |
| 2016/0063093 A1 | 3/2016 | Boucher |
| 2016/0063115 A1 | 3/2016 | Ayan |
| 2016/0162502 A1 | 6/2016 | Zhou |
| 2016/0203238 A1 | 7/2016 | Cherniavskii |
| 2018/0246877 A1* | 8/2018 | Vainas ................ G06F 17/2785 |
| 2018/0268023 A1* | 9/2018 | Korpusik ............ G06F 17/2785 |

* cited by examiner

US 10,769,222 B2

SEARCH RESULT RANKING BASED ON POST CLASSIFIERS ON ONLINE SOCIAL NETWORKS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may improve search result rankings by integrating a vector of classifier scores associated with each retrieved post matching a search query. Currently, posts are ranked based on text matching and structured data (for example, author information, social signals, etc.). However, presenting relevant posts for a given search query, which is typically only a short text string, can be a challenging task. Users on the online social network typically search for posts using a short text string. Merely identifying posts based on the quality of text matching may be inadequate for finding posts that match what the searching user intended with the search query. Even if a post covers one or more objects or concepts indicated by the search query, one or more aspects of the post may not match to what the searching user is actually looking for. Utilizing a plurality of classifier scores associated with a post, where each classifier score represents a degree of relevance of the associated post to the corresponding classifier, may improve the search result rankings because the relevance of posts to the given search query can be evaluated from a plurality of aspects. However, computing such a list of classifier scores for a post may be processor intensive, and thus computing the classifier scores at query time (i.e., during the timeframe where the query is executed and results are returned to the user) may not be feasible. The social-networking system may integrate the classifier information into the query time process by pre-calculating a classifier vector for each post off-line (i.e., not during query time), which can then be fetched along with the document information for matching posts, and then be used as a ranking signal. When a social-networking system receives a search query from a user, the social-networking system may formulate an appropriate ranking model based on embeddings of the search query. The social-networking system may retrieve posts containing at least part of the search query terms from the data storage. The social-networking system may utilize the added features of each retrieved posts in the formulated ranking model during the ranking phase. The social-networking system may present the high ranking posts to the uses as a response to the search query. The added features may be scores for multiple classifiers. The social-networking system may pre-compute the classifier scores for posts (for example, when the post is created) and store the computed scores as a part of document information along with a map to the corresponding post. As an example and not by way of limitation, when a user becomes interested in iRobot Roomba, a robotic vacuum cleaner, the user may search online social network posts using a search query such as "iRobot Roomba." The social-networking system may retrieve posts containing "iRobot" and/or "Roomba." Based on embeddings of the given search query, the social-networking system may determine that iRobot Roomba is a robotic vacuum cleaner, which is a kind of household appliances. The social-networking system may also determine that the user may be interested in purchasing one. The social-networking system may formulate a ranking model where a post will be given a higher ranking if the post is about a household appliance and the post is for-sale based on the determined facts using embeddings of the search query. The social-networking system may also formulate the ranking model in which posts older than a threshold period (e.g., created more than 3 weeks ago) are given lower rankings because the information in the posts might be outdated. The social-networking system may rank the retrieved posts with the formulated ranking model and may present a predetermined number of high ranking posts to the user. Formulating a ranking model for the classifier scores based on given query embeddings can be trained using one of the machine learning technologies. As another example and not by way of limitation, a user may want to view reviews about the Roomba robotic vacuum cleaner. The user may search online social network posts using a search query "iRobot Roomba review." The social-networking system may retrieve posts containing "iRobot," "Roomba," or "review." The social-networking system may formulate a ranking model based on an embedding associated with the search query, where scores for classifiers "review" and "household appliances" may have positive impacts on the ranking of retrieved posts and scores for classifiers "for-sale" or "advertisement" would have negative impacts on the ranking of retrieved posts. The social-networking system may rank the retrieved posts using the formulated ranking model, and may present the high ranking posts to the user. As yet another example and not by way of limitation, the social-networking system may eliminate irrelevant posts from the search results by utilizing the classifiers. A user may search with a query "Dallas Cowboys" because the user wants to search about the National Football League (NFL) team Dallas Cowboys. A presidential candidate may have a speech at the Dallas Cowboys' stadium as a part of the presidential campaign. A number of posts addressing the event and the politician's speech could be posted in the online social network. The posts may have "Dallas Cowboys Stadium" in the text because the event occurred in the stadium. Also, some of those posts may have received a relatively large amount of interactions (e.g., views, likes, shares, etc.) from users of the online social network. But those posts about the politician's speech may not be relevant to the interest of the searching user. The social-networking system may formulate a ranking model for the search query from the user in a way where a classifier for "politics" may have a negative impact and a classifier for "sports" may have a positive impact on the ranking of retrieved posts. The social-networking system may also eliminate time sensitive posts, location sensitive posts, or promotional posts from the search results if necessary by formulating a ranking model in a certain way.

In particular embodiments, the social-networking system may create a pre-calculated classifier vector for a particular post by analyzing the post using a natural-language processing algorithm. This classifier vector may be pre-calculated at any suitable time, such as, for example, when the social-networking system receives a request to post content from a client system of a user of the online social network. A classifier vector associated with a post may comprise a pre-determined number of classifier scores where each classifier score in a classifier vector associated with a post represents a degree of relevance of the post to the corresponding classifier. The social-networking system may receive a request to post content from a client system of a user of the online social network. The social-networking system may calculate a classifier vector associated with the content by analyzing the content using a natural-language processing algorithm. Each classifier score in the classifier vector represents a degree of relevance of the content to the corresponding classifier. The social-networking system may store the classifier vector as a part of document information associated with the content in a data store. The social-networking system may store the content as a post with a link to the document information in the data store. In particular embodiments, the social-networking system may receive, from a client system of a user of an online social network, a search query for posts of the online social network. The search query may comprise one or more query terms. The social-networking system may retrieve, from one or more verticals of the online social network, a plurality of posts of the online social network, where each retrieved post contains in the text of the post at least one of the one or more query terms. The social-networking system may generate a reconstructed embedding of the query based on one or more term embeddings associated with the one or more n-grams of the query, respectively. Each of the one or more term embeddings corresponds to a point in a d-dimensional embedding space. The social-networking system may formulate an evaluation model based at least on the reconstructed embedding of the query. The formulated evaluation model may calculate a relevance score for posts with respect to the search query based at least on the classifier vectors of the posts. To formulate the evaluation model, the social-networking system may provide the reconstructed embedding as an input to an Evaluation-Model Generating Function (EMGF), and may receive the evaluation model from the evaluation-model generating function. The evaluation model may comprise a mathematical function, where the mathematical function comprises variables corresponding to the classifiers in the classifier vector, respectively. The mathematical function may comprise a positive coefficient for a variable corresponding to a classifier in the classifier vector if the reconstructed embedding of the query indicates a positive correlation to the corresponding classifier. A magnitude of the positive coefficient may represent a degree of significance of the corresponding classifier. The mathematical function may comprise a negative coefficient for a variable corresponding to a classifier in the classifier vector if the reconstructed embedding of the query indicates a negative correlation to the corresponding classifier. A magnitude of the negative coefficient may represent a degree of negative significance of the corresponding classifier. The mathematical function may comprise a zero coefficient for a variable corresponding to a classifier in the classifier vector if the reconstructed embedding of the query indicates no correlation to the corresponding classifier. The evaluation model may comprise one or more satisfying conditions. Each satisfying condition may define a satisfying range of a classifier score in the classifier vector for the associated post to be considered as a candidate post to be one of the search results. The Evaluation-Model Generating Function (EMGF) may formulate the evaluation model based on a given list of objects and their relevance scores based on the reconstructed embedding of the query. The EMGF may also take the reconstructed embedding of the querying user as an input. Formulating an evaluation model based on given list of objects and their relevance scores is based on a set of pre-determined rules. In particular embodiments, the EMGF may generate an evaluation model based on a set of predetermined rules that are based on one or more experiments. In particular embodiments, the EMGF may generate an evaluation model based on a deep-learning model. The social-networking system may calculate, for each of the retrieved posts, a relevance score for the post by applying the associated classifier vector to the formulated evaluation model. The social-networking system may rank the retrieved posts based on their respective relevance scores. The social-networking system may send, to the client system in response to the search query, instructions for generating a search-results interface. The search-results interface may comprise references to one or more of the posts presented in ranked order.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
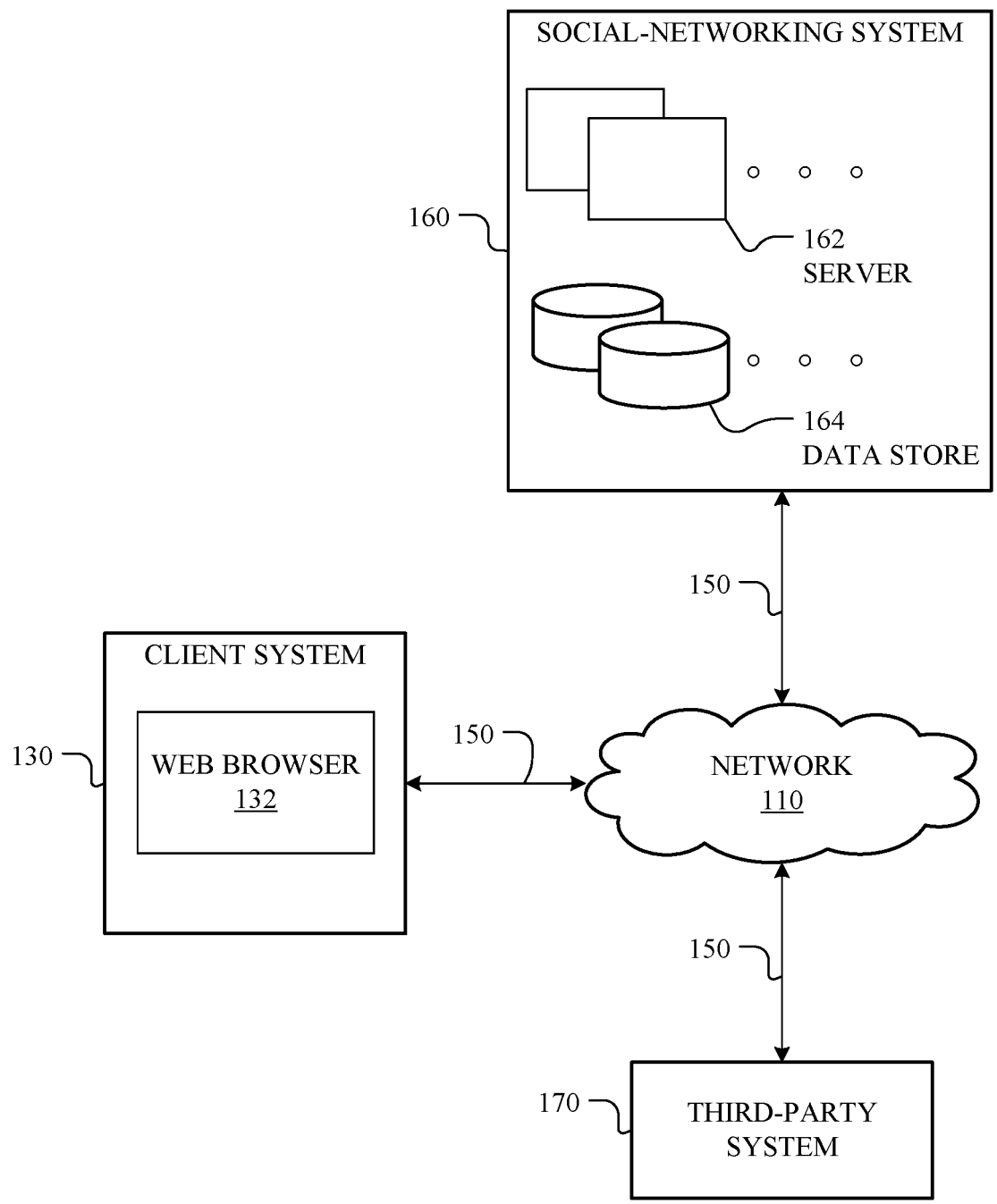
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
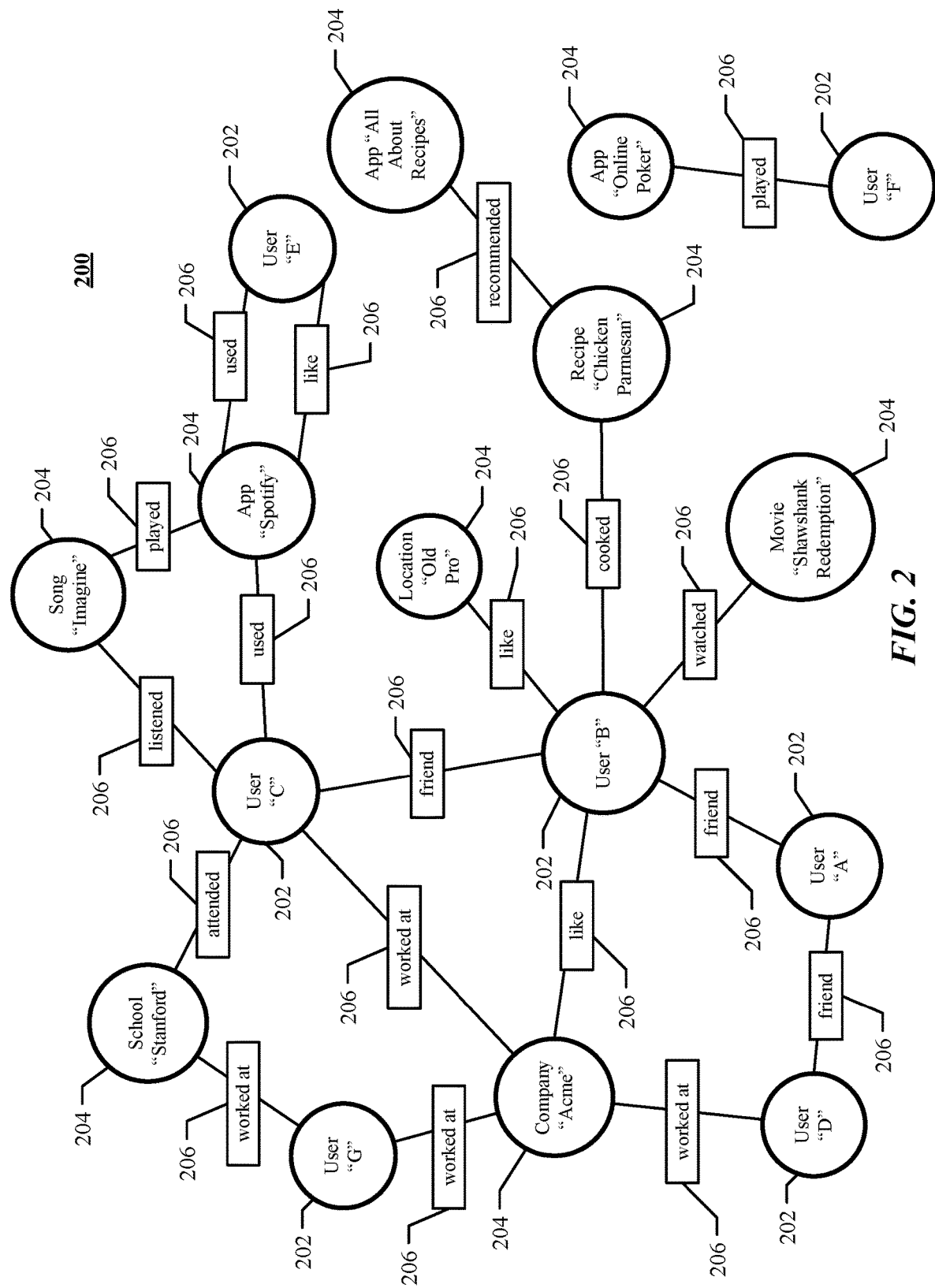
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, the social-networking system 160 may receive, from a client system of a user of an online social network, a query inputted by the user. The user may submit the query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Indexing Based on Object-Type

Figure 3:
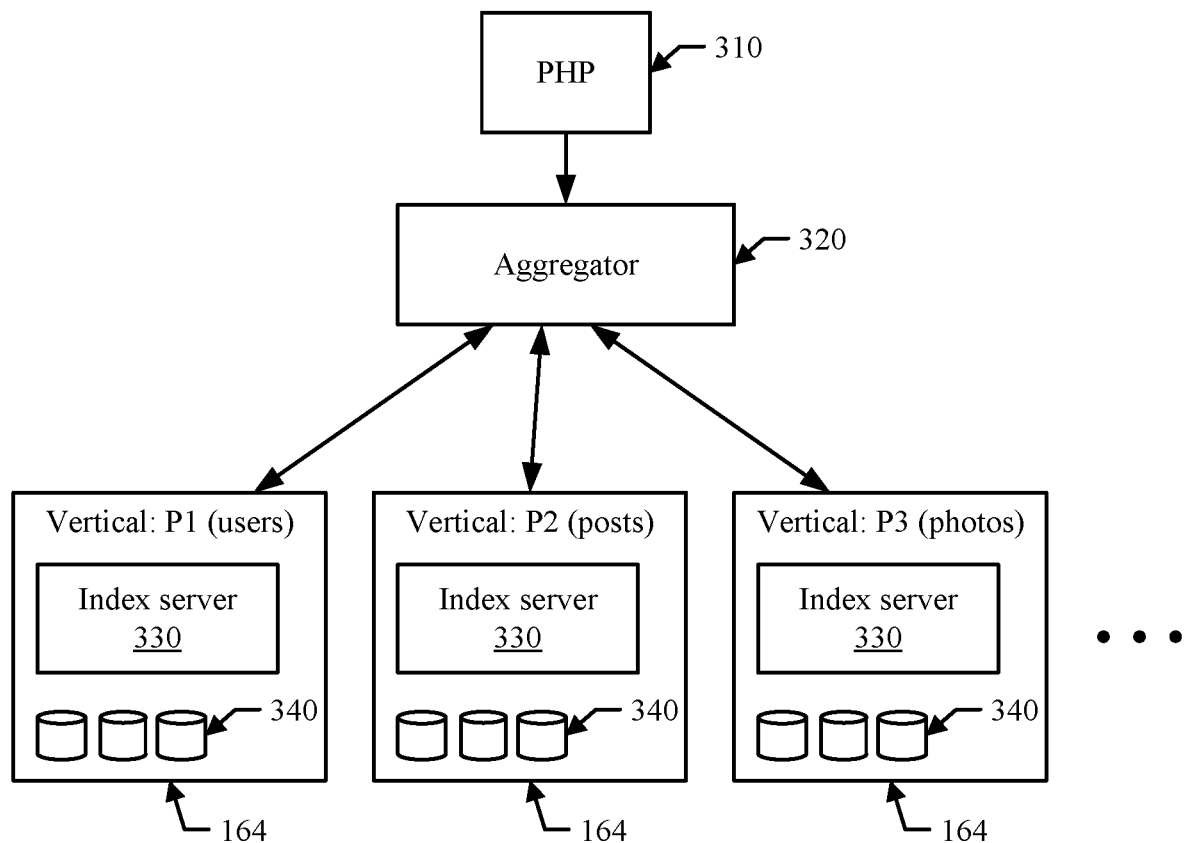
FIG. 3 illustrates an example partitioning for storing objects of a social-networking system.

FIG. 3 illustrates an example partitioning for storing objects of a social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a web interface, an application, a location, a user-profile interface, a concept-profile interface, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers).

The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170). In particular embodiments, an aggregator 320 may be configured to receive the search query from PHP process 310 and distribute the search query to each vertical. The aggregator may comprise one or more computing processes (or programs) hosted by one or more computing devices (e.g. servers) of the social-networking system 160. Particular embodiments may maintain the plurality of verticals 164 as illustrated in FIG. 3. Each of the verticals 164 may be configured to store a single type of object indexed by a search index as described earlier. In particular embodiments, the aggregator 320 may receive a search request. For example, the aggregator 320 may receive a search request from a PHP (Hypertext Preprocessor) process 210 illustrated in FIG. 2. In particular embodiments, the search request may comprise a text string. The search request may be a structured or substantially unstructured text string submitted by a user via a PHP process. The search request may also be structured or a substantially unstructured text string received from another process of the social-networking system. In particular embodiments, the aggregator 320 may determine one or more search queries based on the received search request. In particular embodiments, each of the search queries may have a single object type for its expected results (i.e., a single result-type). In particular embodiments, the aggregator 320 may, for each of the search queries, access and retrieve search query results from at least one of the verticals 164, wherein the at least one vertical 164 is configured to store objects of the object type of the search query (i.e., the result-type of the search query). In particular embodiments, the aggregator 320 may aggregate search query results of the respective search queries. For example, the aggregator 320 may submit a search query to a particular vertical and access index server 330 of the vertical, causing index server 330 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723,861, filed 21 Dec. 2012, and U.S. patent application Ser. No. 13/870,113, filed 25 Apr. 2013, each of which is incorporated by reference.

Vector Spaces and Embeddings

Figure 4:
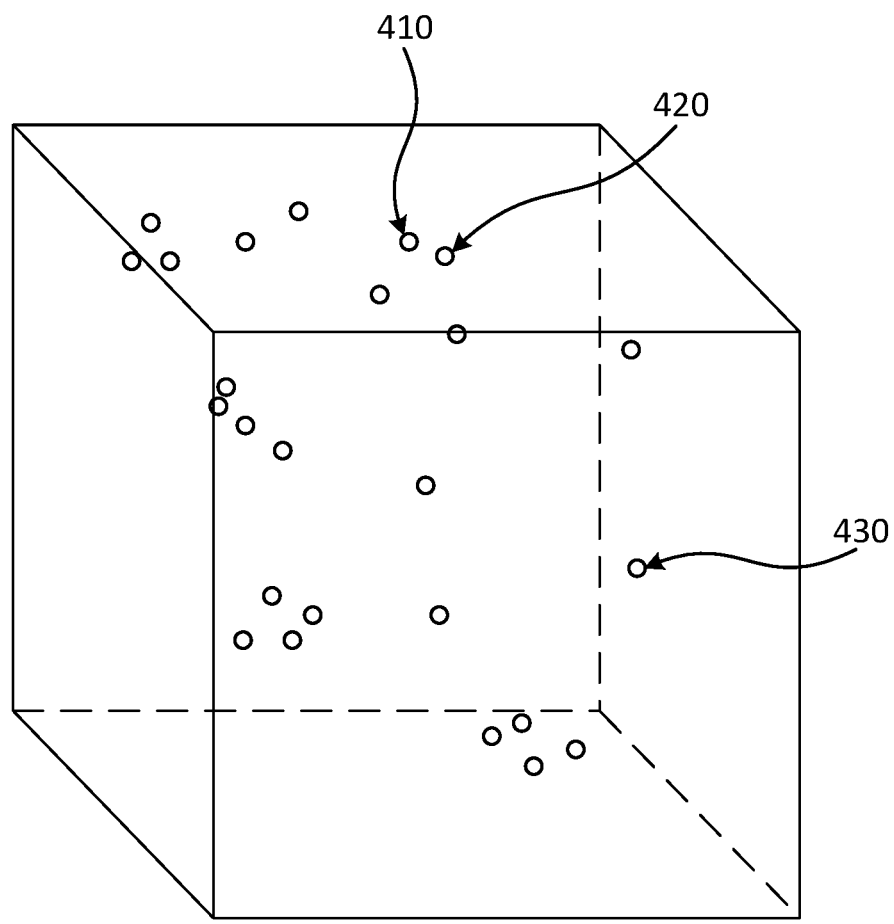
FIG. 4 illustrates an example view of an embedding space.

FIG. 4 illustrates an example view of a vector space 400. In particular embodiments, an object or an n-gram may be represented in a d-dimensional vector space, where d denotes any suitable number of dimensions. Although the vector space 400 is illustrated as a three-dimensional space, this is for illustrative purposes only, as the vector space 400 may be of any suitable dimension. In particular embodiments, an n-gram may be represented in the vector space 400 as a vector referred to as a term embedding. Each vector may comprise coordinates corresponding to a particular point in the vector space 400 (i.e., the terminal point of the vector). As an example and not by way of limitation, vectors 410, 420, and 430 may be represented as points in the vector space 400, as illustrated in FIG. 4. An n-gram may be mapped to a respective vector representation. As an example and not by way of limitation, n-grams $t_1$ and $t_2$ may be mapped to vectors $\vec{v_1}$ and $\vec{v_2}$ in the vector space 400, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 400. In particular embodiments, an n-gram may be mapped to a vector representation in the vector space 400 by using a machine leaning model (e.g., a neural network). The machine learning model may have been trained using a sequence of training data (e.g., a corpus of objects each comprising n-grams).

In particular embodiments, an object may be represented in the vector space 400 as a vector referred to as a feature vector or an object embedding. As an example and not by way of limitation, objects $e_1$ and $e_2$ may be mapped to vectors $\vec{v_1}$ and $\vec{v_2}$ in the vector space 400, respectively, by applying a function $\vec{\pi}$, such that $\vec{v_1} = \vec{\pi}(e_1)$ and $\vec{v_2}\, \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 400. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\|\|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 400. As an example and not by way of limitation, vector 410 and vector 420 may correspond to objects that are more similar to one another than the objects corresponding to vector 410 and vector 430, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Search Result Rankings Based on Post Classifiers

In particular embodiments, the social-networking system 160 may improve search result rankings by integrating a vector of classifier scores associated with each retrieved post matching a search query. Currently, posts are ranked based on text matching and structured data (for example, author information, social signals, etc.). However, presenting relevant posts for a given search query, which is typically only a short text string, can be a challenging task. Users on the online social network typically search for posts using a short text string. Merely identifying posts based on the quality of text matching may be inadequate for finding posts that match what the searching user intended with the search query. Even if a post covers one or more object or concept indicated by the search query, one or more aspects of the post may not match to what the searching user is actually looking for. Utilizing a plurality of classifier scores associated with a post where each classifier score represents a degree of relevance of the associated post to the corresponding classifier may improve the search result rankings because the relevance of posts to the given search query can be evaluated from a plurality of aspects. However, computing such a list of classifier scores for a post may be processor intensive, and thus computing the classifier scores at query time (i.e., during the timeframe where the query is executed and results are returned to the user) may not be feasible. The social-networking system 160 may integrate the classifier information into the query time process by pre-calculating a classifier vector for each post off-line (i.e., not during query time), which can then be fetched along with the document information for matching posts, and then be used as a ranking signal. When a social-networking system 160 receives a search query from a user, the social-networking system 160 may formulate an appropriate ranking model based on embeddings of the search query. The social-networking system 160 may retrieve posts containing at least part of the search query terms from the data storage. The social-networking system 160 may utilize the added features of each retrieved posts in the formulated ranking model during the ranking phase. The social-networking system 160 may present the high ranking posts to the uses as a response to the search query. The added features may be scores for multiple classifiers. The social-networking system 160 may pre-compute the classifier scores for posts (for example, when the post is created) and store the computed scores as a part of document information along with a map to the corresponding post. As an example and not by way of limitation, when a user becomes interested in iRobot Roomba, a robotic vacuum cleaner, the user may search online social network posts using a search query such as "iRobot Roomba." The social-networking system 160 may retrieve posts containing "iRobot" and/or "Roomba." Based on embeddings of the given search query, the social-networking system 160 may determine that iRobot Roomba is a robotic vacuum cleaner, which is a kind of household appliances. The social-networking system 160 may also determine that the user may be interested in purchasing one. The social-networking system 160 may formulate a ranking model where a post will be given a higher ranking if the post is about a household appliance and the post is for-sale based on the determined facts using embeddings of the search query. The social-networking system 160 may also formulate the ranking model in which posts older than a threshold period (e.g., created more than 3 weeks ago) are given lower rankings because the information in the posts might be outdated. The social-networking system 160 may rank the retrieved posts with the formulated ranking model and may present a pre-determined number of high ranking posts to the user. Formulating a ranking model for the classifier scores based on given query embeddings can be trained using one of the machine learning technologies. As another example and not by way of limitation, a user may want to view reviews about the Roomba robotic vacuum cleaner. The user may search online social network posts using a search query "iRobot Roomba review." The social-networking system 160 may retrieve posts containing "iRobot," "Roomba," or "review." The social-networking system 160 may formulate a ranking model based on an embedding associated with the search query, where scores for classifiers "review" and "household appliances" may have positive impacts on the ranking of retrieved posts and scores for classifiers "for-sale" or "advertisement" would have negative impacts on the ranking of retrieved posts. The social-networking system 160 may rank the retrieved posts using the formulated ranking model, and may present the high ranking posts to the user. As yet another example and not by way of limitation, the social-networking system 160 may eliminate irrelevant posts from the search results by utilizing the classifiers. A user may search with a query "Dallas Cowboys" because the user wants to search about the National Football League (NFL) team Dallas Cowboys. A presidential candidate may have a speech at the Dallas Cowboy stadium as a part of the presidential campaign. A number of posts addressing the event and the politician's speech could be posted in the online social network. The posts may have "Dallas Cowboys Stadium" in the text because the event occurred in the stadium. Also, some of those posts may have received a relatively large amount of interactions (e.g., views, likes, shares, etc.) from users of the online social network. But, those posts about the politician's speech may not be relevant to the interest of the searching user. The social-networking system 160 may formulate a ranking model for the search query from the user in a way where a classifier for "politics" may have a negative impact and a classifier for "sports" may have a positive impact on the ranking of retrieved posts. The social-networking system 160 may also eliminate time sensitive posts, location sensitive posts, or promotional posts from the search results if necessary by formulating a ranking model in a certain way. Although this disclosure describes ranking a set of retrieved posts for a given query based on the corresponding classifier vectors in a particular manner, this disclosure contemplates ranking a set of retrieved posts for a given query based on the corresponding classifier vectors in any suitable manner.

In particular embodiments, the social-networking system 160 may create a pre-calculated classifier vector for a post by analyzing the post using a natural-language processing algorithm. The pre-calculation may occur at any suitable time, such as, for example, when the social-networking system 160 receives a request to post content from a client system 130 of a user of the online social network. A classifier vector associated with a post may comprise a pre-determined number of classifier scores, where each classifier score in a classifier vector associated with a post represents a degree of relevance of the post to the corresponding classifier. As an example and not by way of limitation, the social-networking system 160 may receive a request to post text article that is about a vacuum cleaner. The social-networking system 160 may generate an associated classifier vector having a plurality of classifiers scores for a plurality of classifiers, respectively. One of the classifiers may be "Household Appliances," which measures the degree of relevance of the post to the topic of household appliances. Here, the post about the vacuum cleaner may have a score for a classifier "Household Appliances" would be high because a vacuum cleaner is a type of household appliances. As another example and not by way of limitation, the social-networking system 160 may receive a request to post a text article about a pop star Michael Johnson. The social-networking system 160 may create an associated classifier vector with same number of classifiers, in which the score for the "Household Appliances" may be low because the post may not address any household appliance at all. Although this disclosure describes creating classifier vectors for particular content in a particular manner, this disclosure contemplates creating classifier vector for any suitable content in any suitable manner.

Figure 5:
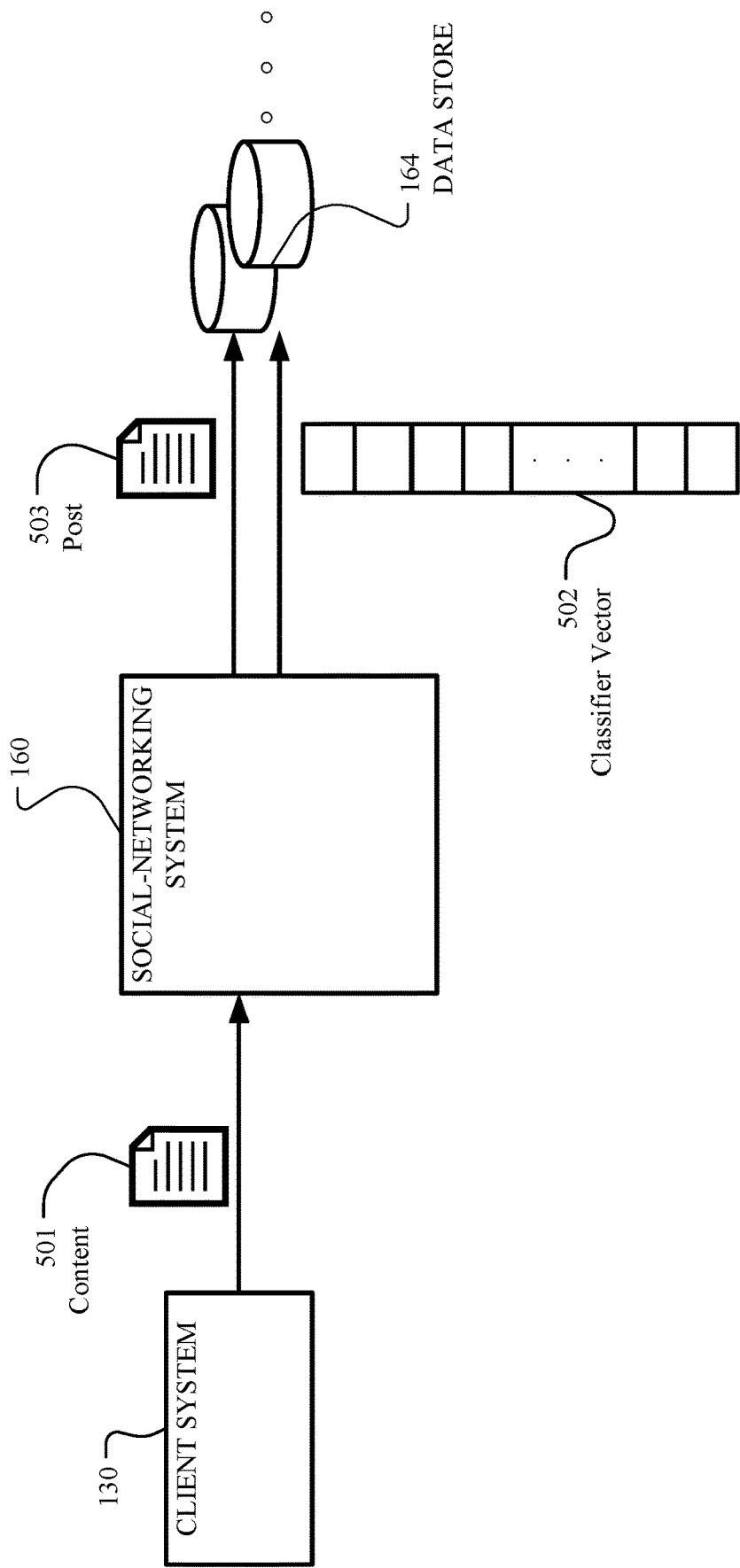
FIG. 5 illustrates an example procedure for generating a classifier vector in response to receiving a request to post content from a client system.

FIG. 5 illustrates an example procedure for generating a classifier vector 502 in response to receiving a request to post content from a client system 130. The social-networking system 160 may receive a request to post content 501 from a client system 130. The social-networking system may calculate a classifier vector 502 associated with the content 501 by analyzing the content 501 using a natural-language processing algorithm. The social-networking system 160 may store the classifier vector 502 as a part of document information of the content to a data store 164. The social-networking system 160 may store the content 501 as a post 503 with a link to the document information to the data store 164. Although this disclosure describes generating a classifier vector and storing the classifier vector in a particular manner, this disclosure contemplates generating a classifier vector and storing the classifier vector in any suitable manner.

In particular embodiments, the social-networking system 160 may receive a request to post content 501 from a client system 130 of a user of the online social network. The user who wants to post any type of content 501 (e.g., text, photo, video) may indicate content 501 to post using available user interface on the client system 130. On receiving the indication from the user, the client system may send the indicated content 501 to the social-networking system 160 over an established communication channel between the client system 130 and the social-networking system 160 using a pre-determined protocol. The protocol may be a standardized protocol such as HTTP, HTTPS, or a proprietary protocol designed for the communications between the client system 130 and the social-networking system 160. As an example and not by way of limitation, a user named "Alice" may access social-networking system 160 using a browser on her client system 130. When Alice finishes writing a short article about her plan to visit her parents next week, the user may click a button icon on the web interface. The client system 130 may send the written article to the social-networking system 160 using HTTPS protocol. As another example and not by way of limitation, another user named "Bob" may access the online social network using an application on his mobile phone. Bob may choose a picture from his picture album and click a button to post the selected picture. The mobile phone, as a client system 130, may send the picture to the social-networking system 160 using a proprietary protocol designed for the application. Although this disclosure describes posting particular content in a particular manner, this disclosure contemplates posting any suitable content in any suitable manner.

In particular embodiments, the social-networking system 160 may calculate a classifier vector 502 associated with the content 501 by analyzing the content 501 using a natural-language processing algorithm. Utilizing classifier scores in the classifier vectors 502 associated with the posts in a data store may improve search rankings by capturing the meaning of a post using scores from multiple classifiers. However, calculating classifier vectors 502 for a large number of retrieved posts at query time may not be feasible because such calculation may be processor intensive. To overcome this technical problem and speed up the processing of search queries, the social-networking system 160 may calculate a classifier vector 502 on receiving content 501 to post from a client system 130. The social-networking system 160 may analyze the content 501 using a natural-language processing algorithm to generate a corresponding classifier vector 502. In particular embodiments, the social-networking system 160 may analyze the content 501 using any suitable analysis algorithm to generate a corresponding classifier vector 502. Each classifier score in the classifier vector 502 represents a degree of relevance of the content 501 to the corresponding classifier. As an example and not by way of limitation, the social-networking system 160 may receive a request to post a review on iRobot Roomba, a robot vacuum cleaner. The social-networking system 160 may generate a classifier vector 502 associated with the content 501, in which "Household Appliances" classifier may have a high score, and "review" classifier may also have a high score, but some other classifiers, for example but not limited to, "Celebrity" or "Sport" classifiers, may have low scores. As another example and not by way of limitation, the social-networking system 160 may receive a request to post a personal advertisement to sell a used iRobot Roomba. The social-networking system 160 may generate a classifier vector 502 associated with the content 501, in which the "Household Appliances" classifier may have a high score, and "For-sale" classifier may also have a high score. As yet another example and not by way of limitation, the social-networking system 160 may receive a request to post an article providing analysis on a scheduled NFL game between Dallas Cowboys and New York Giants. The social-networking system 160 may generate a classifier vector 502 associated with the content 501, in which "sports" classifier may have a high score, and "review" classifier may have high score because the game analysis may comprise a review of both teams' capabilities. Although this disclosure describes calculating particular classifiers for particular content in a particular manner, this disclosure contemplates calculating any suitable classifiers for any suitable content in any suitable manner.

In particular embodiments, the social-networking system 160 may store the classifier vector 502 as a part of document information associated with the content 501 in a data store 164. The social-networking system 160 may store the content 501 as a post 503 with a link to the document information in the data store 164. To utilize the generated classifier vector 502 at query time, the classifier vector 502 may need to be stored in the data store 164. When the social-networking system 160 retrieves a set of posts 503 upon receiving a query, the social-networking system 160 may need to be able to access the corresponding classifier vectors 502 as well. Thus, the post 503 may be stored with a link to the document information with the corresponding classifier vector 502. In particular embodiments, the document information may have a link to the post 503. As an example and not by way of limitation, the social-networking system 160 may have generated a classifier vector 502 upon receiving a request to post an article regarding a politician's speech during a presidential campaign at the Dallas Cowboy stadium. The social-networking system 160 may have generated a corresponding classifier vector 502, and store the classifier vector 502 as a part of document information of the article to the data store 164. The social-networking system 160 may store the article along with a link to the document information to the data store 164. Although this disclosure describes storing particular classifier vectors for particular posts in a particular manner, this disclosure contemplates storing any suitable classifier vectors for any suitable post in any suitable manner.

In particular embodiments, the social-networking system 160 may detect a signal to begin a batch classifier vector 502 calculation process. Even though the social-networking system 160 may generate an associated classifier vector 502 upon receiving a request to post content 501, some stored posts 503 may not have associated classifier vectors 502 for various reasons. Some posts 503 may have been posted before the classifier vector 502 was introduced. The social-networking system 160 may have experienced technical glitches for generating classifier vectors 502 for some of the posts 503. The social-networking system 160 may generate classifier vectors 502 for posts 503 without associated classifier vectors 502 in a batch process. The batch process may be triggered manually or periodically. As an example and not by way of limitation, the social-networking system 160 may detect a signal to begin a weekly batch process to generate classifier vectors 502. Although this disclosure describes detecting a signal to begin a batch vector generation process in a particular manner, this disclosure contemplates detecting a signal to begin a batch vector generation process in any suitable manner.

In particular embodiments, the social-networking system 160 may search the one or more verticals of the online social network to identify posts 503 that have no associated classifier vector. When the batch process to generate classifier vectors, the social-networking system 160 may need to identify the posts 503 that do not have associated classifier vector. In particular embodiments, once the posts 503 without associated classifier vector 502 are identified, the social-networking system 160 may calculate, for each identified post 503, a classifier vector 502 associated with the post 503 by analyzing the post 503 using a natural-language processing algorithm. The social-networking system 160 may store the classifier vector 502 as a part of document information of the post 503 to the one or more verticals of the online social network. The social-networking system 160 may update the post 503 so that the post 503 has a link to the document information. Although this disclosure describes generating classifier vectors 502 for posts 503 that do not have associated classifier vectors 502 during a batch process in a particular manner, this disclosure contemplates generating classifier vectors 502 for posts 503 that do not have associated classifier vectors 502 during a batch process in any suitable manner.

In particular embodiments, the social-networking system 160 may receive, from a client system 130 of a user of an online social network, a search query for posts 503 of the online social network. The search query may comprise one or more query terms. A user of an online social network may search for information relating to a specific subject matter (e.g., users, concepts, external content or resource, other suitable subject matter) by providing a short phrase describing the subject matter, often referred to as a "search query," to the social-networking system 160. The client system 130 may access the social-networking system 160 using a web browser 132, or a native application associated with the social-networking system 160 (e.g., a mobile social-networking application, a messaging application, another suitable application, or any combination thereof), either directly, via a network 110, or via a third-party system 170. When the user enters the search query in the query field and clicks a "search" button or takes an action that has an equivalent effect, the client system 130 may send the search query to the social-networking system 160 using, for example, an HTTP request. As an example and not by way of limitation, when a user named "Alice" becomes interested in iRobot Roomba, a robotic vacuum cleaner, Alice may search online social network posts using a search query such as "iRobot Roomba." The client system 130 of Alice may send the search query "iRobot Roomba" to the social-networking system 160. Although this disclosure describes the social-networking system 160 receiving a search query in a particular manner, this disclosure contemplates the social-networking system 160 receiving a search query in any suitable manner.

In particular embodiments, the social-networking system 160 may retrieve, from one or more verticals of the online social network, a plurality of posts 503 of the online social network, where each retrieved post contains in the text of the post at least one of the one or more query terms. Because the social-networking system 160 may have generated and stored a classifier vector 502 for each post 503, each retrieved post is associated with a pre-calculated classifier vector 502 comprising a plurality of classifier scores corresponding to a plurality of classifications, respectively. Each classifier score in a classifier vector 502 associated with a post represents a degree of relevance of the post to the corresponding classifier. After receiving a query from the client system 130, the social-networking system 160 may prepare a set of search results. As the first step, the social-networking system 160 may retrieve posts 503 that contain at least one of the one or more query terms from one or more data stores 164 of the social-networking system 160. In particular embodiments, the social-networking system 160 may retrieve posts 503 that contain each of the one or more query terms. The posts 503 may be stored in any suitable data storage within the social-networking system 160 or outside the social-networking system 160. When the social-networking system 160 retrieves a set of posts 503 from the data stores 164, the social-networking system 160 may also retrieve corresponding classifier vectors 502 from the data stores 164 using the links stored along with the posts 503. As an example and not by way of limitation, the social-networking system 160 may retrieve posts 503 that contain either "iRobot" or "Roomba" in the text when the social-networking system 160 receives a query "iRobot Roomba." When the social-networking system 160 retrieves the posts 503, the social-networking system 160 may also retrieve corresponding classifier vectors 502 from the data stores 164 as well because the stored pre-calculated classifier vectors 502 may be utilized when the social-networking system 160 ranks the retrieved posts 503 for the given query. As another example and not by way of limitation, the social-networking system 160 may retrieve posts 503 containing both "Roomba" and "review" in the text when the social-networking system 160 receives a query "Roomba review." The retrieved posts 503 may not have "Roomba" and "review" together. "Roomba" and "review" may appear separately in the text. The social-networking system 160 may also retrieve corresponding classifier vectors 502 for the retrieved posts 503 using the links stored with the posts 503. Although this disclosure describes retrieving posts 503 and corresponding classifier vectors 502 upon receiving a query in a particular manner, this disclosure contemplates retrieving posts 503 and corresponding classifier vectors 502 upon receiving a query in any suitable manner.

In particular embodiments, the social-networking system 160 may generate a reconstructed embedding of the query based on one or more term embeddings associated with the one or more n-grams of the query, respectively. Each of the one or more term embeddings corresponds to a point in a d-dimensional embedding space. A function $\vec{\Pi}$ may map an input to a reconstructed embedding of the input in an embedding space. In particular embodiments, the reconstructed embedding of the query may be generated by pooling the one or more term embeddings associated with the one or more of the n-grams of the query, respectively. As an example and not by way of limitation, for a query q comprising n-grams $t_1$ through $t_n$, $\vec{\Pi}(q)$ may be a pooling of the term embeddings for $t_1$ through $t_n$. In particular embodiments, the pooling may comprise one or more of a sum pooling, an average pooling, a weighted pooling, a pooling with temporal decay, a maximum pooling, or any other suitable pooling. As an example and not by way of limitation, the pooling may be a sum pooling, such that $\vec{\Pi}(q) = \sum_{i=1}^{n} \vec{\pi}(t_i)$. In particular embodiments, the social-networking system 160 may determine the one or more term embeddings associated with the one or more query terms, respectively, based on a deep-learning model. Although this disclosure describes generating a reconstructed embedding of a query in a particular manner, this disclosure contemplates generating a reconstructed embedding of a query in any suitable manner.

Figure 6A:
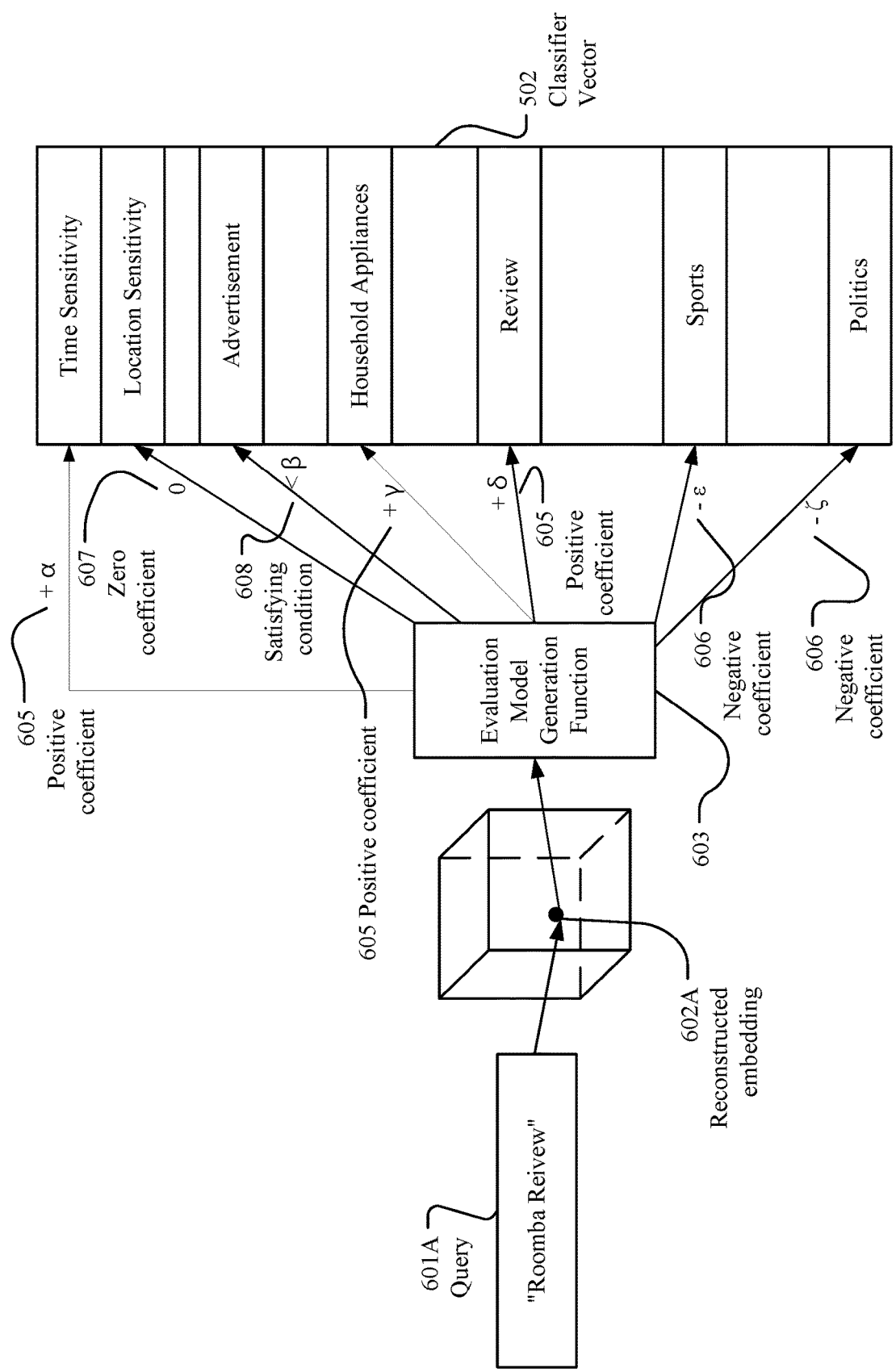
FIG. 6A-6B illustrate examples of generating evaluation model based on a given query.
Figure 6B:
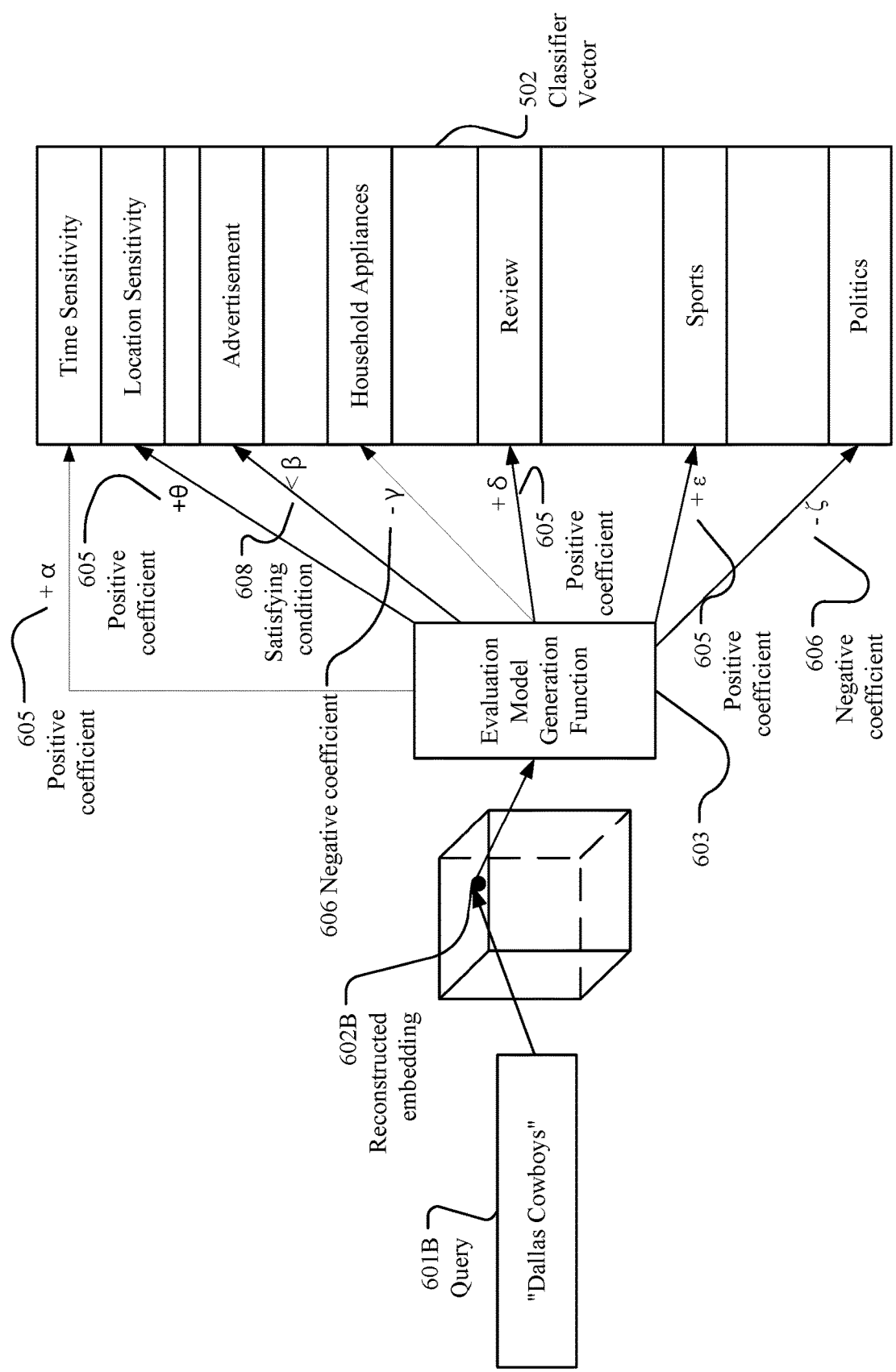

In particular embodiments, the social-networking system 160 may formulate an evaluation model based at least on the reconstructed embedding of the query. The formulated evaluation model may calculate a relevance score for posts with respect to the search query based at least on the classifier vectors of the posts. The social-networking system 160 may compare the reconstructed embedding of the query to a large number of object embeddings in the library to identify one or more objects and their relevance scores to the given query based on a similarity metric of the reconstructed embedding of the query and an object embedding associated with the identified object. The identified one or more objects may have a higher relevance score than the other objects in the library. The social-networking system 160 may utilize the one or more objects and their relevance scores to the given query to determine which classifier may have positive relevance to the query and which classifier may have negative relevance to the query among the classifiers in the classifier vector 502. FIG. 6A illustrates an example of generating an evaluation model. The social-networking system 160 receives a query "Roomba Review" 601A from a user named "Alice," and may generate a reconstructed embedding 602A of the given query 601A. The social-networking system 160 may comprise a logical function called Evaluation-Model Generation Function (EMGF) 603. The social-networking system 160 may provide the generated reconstructed embedding 602A to the EMGF 603. The EMGF 603 may compare the reconstructed embedding 602A of the query 601A to a large number of object embeddings in the library. The EMGF 603 may determine that "household appliances" object has high relevance score to the given query. The EMGF 603 may also determine that "review" object has high relevance score to the given query. Based on these identified objects and their relevance scores, the EMGF 603 may generate an evaluation model that will be used to score the retrieved posts 503 based on the classifier scores in their associated classifier vectors 502, respectively. Because the query is requesting a review, "Time Sensitivity" classifier may have positive relevance to the given query 601A. Thus, the EMGF 603 may assign a positive coefficient 605 to the "Time Sensitivity" classifier. Because the EMGF 603 may realize no relevance of "Location Sensitivity" to the given query 601A, the EMGF 603 may assign a zero coefficient 607 to "Location Sensitivity" classifier. Because the query 601A is asking reviews, any advertisement should be filtered out from the query results. A satisfying condition 608 that "Advertisement" classifier score should be less than β, where β may be a pre-determined threshold for "Advertisement" classifier to be safely considered not an advertisement, may be assigned to the "Advertisement" classifier. Because the EMGF 603 may determine that the query 601A has no intention for posts addressing either sports or politics, the EMGF 603 may assign negative coefficients 606 to "sports" and "politics" classifiers. Likewise, the EMGF 603 may assign positive coefficients to "Household Appliances" and "review" classifiers. FIG. 6A illustrates only a part of generating an example evaluation model. A classifier vector 502 may comprise more number of classifier scores, and the EMGF 603 may assign either a coefficient or a satisfying condition to each of the classifier in the classifier vector 502. FIG. 6B illustrates another example of generating an evaluation model. The social-networking system 160 receives a query "Dallas Cowboys" 601B from another user named "Bob," a fan of Dallas Cowboys, an NFL team. The social-networking system 160 may generate a reconstructed embedding 602B of the given query 601B. The social-networking system 160 provides the generated reconstructed embedding to the EMGF 603. The EMGF 603 may compare the reconstructed embedding of the query to a large number of object embeddings in the library. The EMGF 603 may determine that "sports" object has high relevance score to the given query 601B. The EMGF 603 may also determine that "NFL," "National Football Conference (NFC)," "Dallas," and "Texas" objects have high relevance score to the given query 601B. Based on these identified objects and their relevance scores, the EMGF 603 may generate an evaluation model that will be used to score the retrieved posts 503 based on classifier scores in their associated classifier vectors 502, respectively. The EMGF 603 may assign positive coefficients 605 to "Time Sensitivity," "Location Sensitivity," "review," and "sports" classifiers. Among those positive classifiers 605, the EMGF 603 may assign the largest coefficient to the "sports" classifier because the "sports" classifier is most relevant to the query "Dallas Cowboys." The EMGF 603 may assign negative coefficients 606 to "politics" and "Household Appliances" classifiers. A satisfying condition 608 that the classifier score should be less than β may also be assigned to the "Advertisement" classifier to filter advertisements out from the query results. FIG. 6B illustrates only a part of generating an example evaluation model. A classifier vector 502 may comprise more number of classifier scores, and the EMGF 603 may assign either a coefficient or a satisfying condition to each of the classifier in the classifier vector 502. The EMGF 603 may be a logical function implemented within the social-networking system 160. In particular embodiments, the EMGF 603 may be deployed on any computing device other than the social-networking system 160 and may be accessed by the social-networking system 160 remotely. Although this disclosure describes generating an evaluation model based on a reconstructed embedding of the given query in a particular manner, this disclosure contemplates generating an evaluation model based on a reconstructed embedding of the given query in any suitable manner.

In particular embodiments, to formulate the evaluation model, the social-networking system 160 may provide the reconstructed embedding as an input to an Evaluation-Model Generating Function (EMGF) 603, and may receive the evaluation model from the evaluation-model generating function. In particular embodiments, the social-networking system 160 may also provide the reconstructed embedding of the querying user to the EMGF 603. The reconstructed embedding of the querying user may allow the EMGF 603 to generate a personalized evaluation model. As an example and not by way of limitation, continuing with the prior example illustrated in FIG. 6B, the social-networking system 160 may provide the reconstructed embedding of Bob, the querying user, to the EMGF 603 in addition to the reconstructed embedding of the query "Dallas Cowboys." The EMGF 603 may determine that Bob does not like reading any post regarding politics. The EMGF 603 may increase the magnitude of the negative coefficient assigned to the "politics" classifier. In particular embodiments, the EMGF 603 may assign a satisfying condition that the "politics" classifier score should be less than in order to filter out any post with political topics. Although this disclosure describes providing a particular input to the EMGF 603 in a particular manner, this disclosure contemplates providing a particular input to the EMGF 603 in any suitable manner.

In particular embodiments, the evaluation model may comprise a mathematical function, where the mathematical function comprises variables corresponding to the classifiers in the classifier vector, respectively. The evaluation function F may comprise $\Sigma_{i=1}^{n} c_i \cdot x_i$, where $x_i$ represents each classifier score in a classifier vector and $c_i$ represents the coefficient assigned to the corresponding classifier. The coefficient may be positive value, negative value, or zero. As an example and not by way of limitation, continuing with the prior example illustrated in FIG. 6A, the classifier scores in a classifier vector 502 for classifiers "Time Sensitivity," "Location Sensitivity," "Household Appliances," "review," "sports," and "politics" will be applied to the variables $x_i$ in the evaluation model, respectively, to compute a relevance score of the associated post with respect to the given query. Although this disclosure describes constructing an evaluation model as a mathematical function in a particular manner, this disclosure contemplates constructing an evaluation model as a mathematical function in any suitable manner.

In particular embodiments, the mathematical function may comprise a positive coefficient for a variable corresponding to a classifier in the classifier vector if the reconstructed embedding of the query indicates a positive correlation to the corresponding classifier. A magnitude of the positive coefficient may represent a degree of significance of the corresponding classifier. As an example and not by way of limitation, continuing with the prior example illustrated in FIG. 6A, positive coefficients may be assigned to classifiers "Time Sensitivity," "Household Appliances," and "review". The coefficient value assigned to the "Household Appliances" may be larger than the coefficient values assigned to "Time Sensitivity" and "review" because the classifier "Household Appliances" may have bigger significance than the classifiers "Time Sensitivity" or "review." Although this disclosure describes assigning positive coefficients to variables in the evaluation model in a particular manner, this disclosure contemplates assigning positive coefficients to variables in the evaluation model in any suitable manner.

In particular embodiments, the mathematical function may comprise a negative coefficient for a variable corresponding to a classifier in the classifier vector if the reconstructed embedding of the query indicates a negative correlation to the corresponding classifier. A magnitude of the negative coefficient may represent a degree of negative significance of the corresponding classifier. Assigning a negative coefficient to a particular classifier may result in ranking posts that have high relevance to the particular classifier because those posts may have a strong chance of not being relevant to the given query. As an example and not by way of limitation, continuing with the prior example illustrated in FIG. 6A, negative coefficients may be assigned to classifiers "sports" and "politics" because any posts addressing sports or politics may not be relevant to a robot vacuum cleaner. As another example and not by way of limitation, continuing with the prior example illustrated in FIG. 6B, a presidential candidate may have a speech at the Dallas Cowboy stadium as a part of her presidential campaign. A number of posts addressing the event and the politician's speech may be posted in the online social network. The posts may have "Dallas Cowboys Stadium" in the text because the event occurred in the stadium. Also, some of those posts may have got lots of attentions from the social networking users. But, those posts may not be relevant to the interest of Bob, the searching user. The score for the "politics" classifier would be considerably high for those posts because those posts address a political event and a politician. Assigning a high magnitude negative coefficient in the evaluation model may push back those posts in the ranking because their relevance scores would become low due to high magnitude negative coefficient assigned to the "politics" classifier, the value of which would be high for those posts. Although this disclosure describes assigning negative coefficients to variables in the evaluation model in a particular manner, this disclosure contemplates assigning negative coefficients to variables in the evaluation model in any suitable manner.

In particular embodiments, the mathematical function may comprise a zero coefficient for a variable corresponding to a classifier in the classifier vector if the reconstructed embedding of the query indicates no correlation to the corresponding classifier. Unlike the negative coefficient, zero coefficients may eliminate corresponding classifiers from the evaluation model. A zero coefficient may be assigned to a classifier when the classifier may not have correlation to the given query. As an example and not by way of limitation, continuing with the prior example illustrated in FIG. 6A, a zero coefficient may be assigned to the "Location Sensitivity" classifier because being location sensitive may have nothing to do with the relevance to the given query. Although this disclosure describes assigning zero coefficients to variables in the evaluation model in a particular manner, this disclosure contemplates assigning zero coefficients to variables in the evaluation model in any suitable manner.

In particular embodiments, the evaluation model may comprise one or more satisfying conditions. Each satisfying condition may define a satisfying range of a classifier score in the classifier vector for the associated post to be considered as a candidate post to be one of the search results. In particular embodiments, the social-networking system 160 may filter a post from a set of the retrieved posts if any classifier score in the classifier vector associated with the post does not satisfy any of the one or more satisfying conditions in the evaluation model. As an example and not by way of limitation, continuing with the prior example illustrated in FIG. 6A, a satisfying condition that the score should be less than $\beta$ for the "Advertisement" classifier to filter out any advertisement from the query results. When an advertisements post is created the "Advertisements" classifier score would be set high while an associated classifier vector is created. Thus, the assigned satisfying condition may eliminate many of the advertisement posts from the query results. Assigning a negative coefficient to a classifier may push posts with high classifier score for the corresponding classifier. However, those posts may end up with high rank if the other classifier scores indicate the strong relevance of the posts to the given query. Assigning a satisfying condition to a classifier may have more significant impact on the query results by filtering posts that do not satisfy the condition. Although this disclosure describes assigning satisfying conditions in an evaluation model in a particular manner, this disclosure contemplates assigning satisfying conditions in an evaluation model in any suitable manner.

The Evaluation-Model Generating Function (EMGF) 603 may formulate an evaluation model based on a given list of objects and their relevance scores that are identified by comparing the reconstructed embedding of the query to a plurality of object embeddings in the library. The EMGF 603 may also take the reconstructed embedding of the querying user as an input. Formulating an evaluation model based on given list of objects and their relevance scores is based on a set of pre-determined rules. In particular embodiments, the EMGF 603 may generate an evaluation model based on a set of predetermined rules that are based on one or more experiments. In particular embodiments, the EMGF 603 may generate an evaluation model based on a deep-learning model. Although this disclosure describes formulating an evaluation model in a particular manner, this disclosure contemplates formulating an evaluation model in any suitable manner.

In particular embodiments, the social-networking system 160 may calculate, for each of the retrieved posts, a relevance score for the post by applying the associated classifier vector to the formulated evaluation model. If the evaluation model comprises one or more satisfying conditions, the social-networking system 160 may filter posts that do not satisfy the one or more satisfying conditions from the set of retrieved posts. Then, the social-networking system 160 may calculate a relevance score for each post in the set of retrieved posts by applying classifier scores to the corresponding variables in the evaluation model. As an example and not by way of limitation, continuing with the prior example illustrated in FIG. 6A, the social-networking system 160 may filter posts with the value of "Advertisement" classifier score larger than or equal to $\beta$ from the set of retrieved posts. Then, the social-networking system 160 may calculate an evaluation-score for each post in the set of remaining retrieved posts by applying the classifier scores in the corresponding classifier vector to the corresponding variables in the evaluation-model. Although this disclosure describes calculating a relevance score based on the evaluation model in a particular manner, this disclosure contemplates calculating a relevance score based on the evaluation model in any suitable manner.

In particular embodiments, the social-networking system 160 may rank the retrieved posts based on their respective relevance scores. The social-networking system 160 may sort the posts in the remaining set of retrieved posts based on the calculated relevance scores. The order of the posts may be the rank of the posts. As an example and not by way of limitation, the social-networking system 160 may have finished calculating the scores for all the posts in the remaining set of retrieved posts. The social-networking system 160 may then rank the posts by sorting the posts with the calculated relevance scores of the posts. The social-networking system 160 may rank a post with the highest score first and may rank another post with the next highest score second, and so on. Although this disclosure describes ranking the posts in a particular manner, this disclosure contemplates ranking the posts in any suitable manner.

In particular embodiments, the social-networking system 160 may send, to the client system 130 in response to the search query, instructions for generating a search-results interface. The search-results interface may comprise references to one or more of the posts presented in ranked order. The client system 130 may generate a search-results interface and may present the interface to the querying user as a response to the query request. In particular embodiments, the interface may include the contents of the high-ranking posts and may allow the user to navigate to the lower ranking posts. In particular embodiments, the interface may comprise a list of post titles along with hypertext links to the posts and an interface to allow the user to navigate through the posts. As an example and not by way of limitation, the social-networking system 160 may send an HTTP response with instructions for generating a search-results interface to a client system 130. On receiving the HTTP response from the social-networking system 160, the client system 130 may present a search-results page on the web browser. The interface may comprise references to a number of the high-rank posts. The user may be able to navigate towards the lower ranking posts. Although this disclosure describes providing search results in a particular manner, this disclosure contemplates providing search results in any suitable manner.

Figure 7:
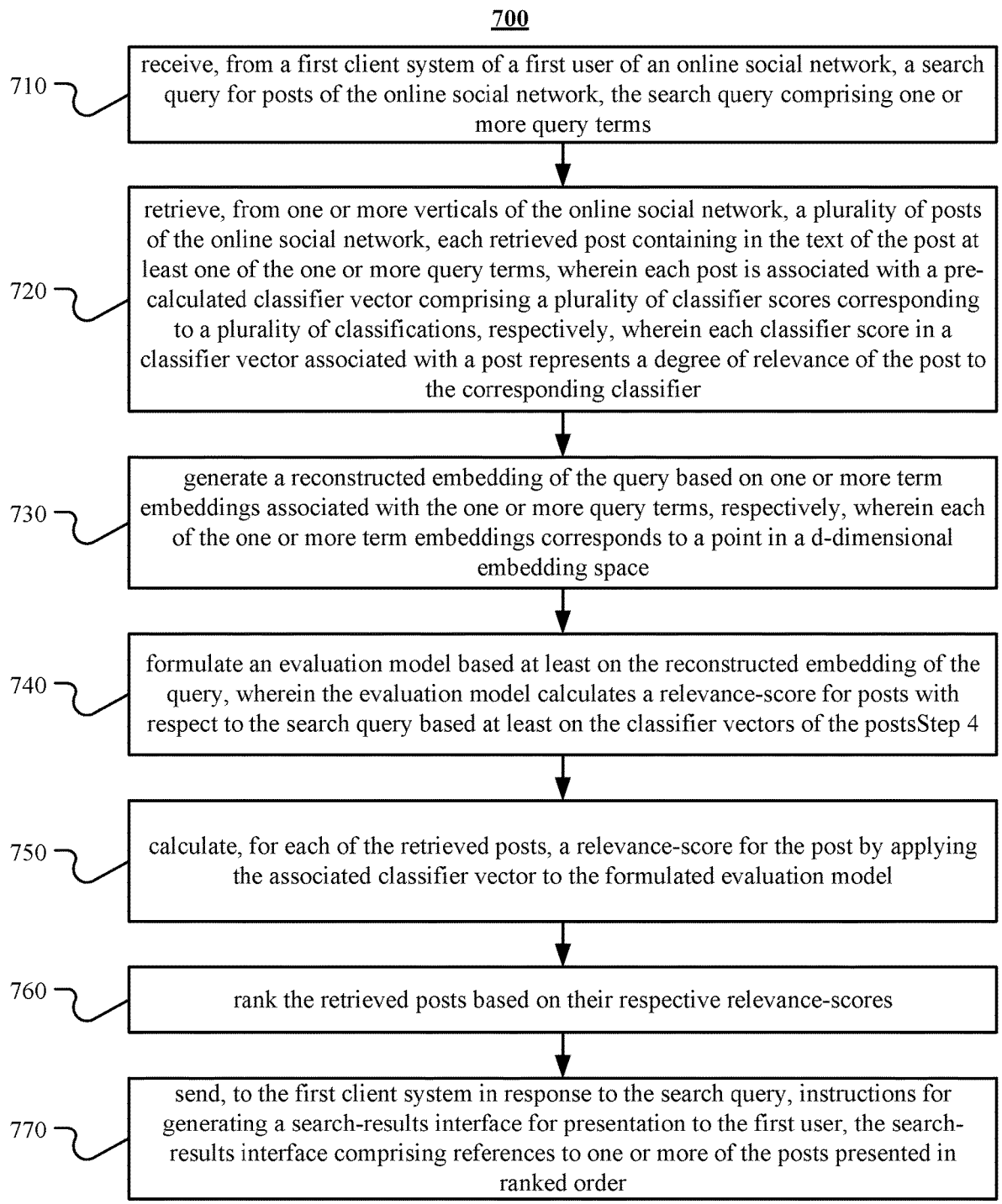
FIG. 7 illustrates an example method for presenting query results by utilizing pre-calculated classifier vectors.

FIG. 7 illustrates an example method for presenting query results by utilizing pre-calculated classifier vectors. The method may begin at step 710, where the social-networking system 160 may receive, from a first client system of a first user of an online social network, a search query for posts of the online social network, the search query comprising one or more query terms. At step 720, the social-networking system 160 may retrieve, from one or more verticals of the online social network, a plurality of posts of the online social network, each retrieved post containing in the text of the post at least one of the one or more query terms, wherein each post is associated with a pre-calculated classifier vector comprising a plurality of classifier scores corresponding to a plurality of classifications, respectively, wherein each classifier score in a classifier vector associated with a post represents a degree of relevance of the post to the corresponding classifier. At step 730, the social-networking system 160 may generate a reconstructed embedding of the query based on one or more term embeddings associated with the one or more query terms, respectively, wherein each of the one or more term embeddings corresponds to a point in a d-dimensional embedding space. At step 740, the social-networking system 160 may formulate an evaluation model based at least on the reconstructed embedding of the query, wherein the evaluation model calculates a relevance score for posts with respect to the search query based at least on the classifier vectors of the posts. At step 750, the social-networking system 160 may calculate, for each of the retrieved posts, a relevance score for the post by applying the associated classifier vector to the formulated evaluation model. At step 760, the social-networking system 160 may rank the retrieved posts based on their respective relevance scores. At step 770, the social-networking system 160 may send, to the first client system in response to the search query, instructions for generating a search-results interface for presentation to the first user, the search-results interface comprising references to one or more of the posts presented in ranked order. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for presenting query results by utilizing pre-calculated classifier vectors including the particular steps of the method of FIG. 7, this disclosure contemplates any suitable method for presenting query results by utilizing pre-calculated classifier vectors including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web interfaces, in one or more e-mails, or in connection with search results requested by a user. In addition or as an alternative, an advertisement may be one or more sponsored stories (e.g., a news-feed or ticker item on the social-networking system 160). A sponsored story may be a social action by a user (such as "liking" an interface, "liking" or commenting on a post on an interface, RSVPing to an event associated with an interface, voting on a question posted on an interface, checking in to a place, using an application or playing a game, or "liking" or sharing a website) that an advertiser promotes, for example, by having the social action presented within a pre-determined area of a profile interface of a user or other interface, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results interface, where sponsored content is promoted over non-sponsored content.

In particular embodiments, an advertisement may be requested for display within social-networking-system web interfaces, third-party web interfaces, or other interfaces. An advertisement may be displayed in a dedicated portion of an interface, such as in a banner area at the top of the interface, in a column at the side of the interface, in a GUI within the interface, in a pop-up window, in a drop-down menu, in an input field of the interface, over the top of content of the interface, or elsewhere with respect to the interface. In addition or as an alternative, an advertisement may be displayed within an application. An advertisement may be displayed within dedicated interfaces, requiring the user to interact with or watch the advertisement before the user may access an interface or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) an interface associated with the advertisement. At the interface associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 160) or RSVP (e.g., through the social-networking system 160) to an event associated with the advertisement. In addition or as an alternative, an advertisement may include social-networking-system content directed to the user. As an example and not by way of limitation, an advertisement may display information about a friend of the user within the social-networking system 160 who has taken an action associated with the subject matter of the advertisement.

Systems and Methods

Figure 8:
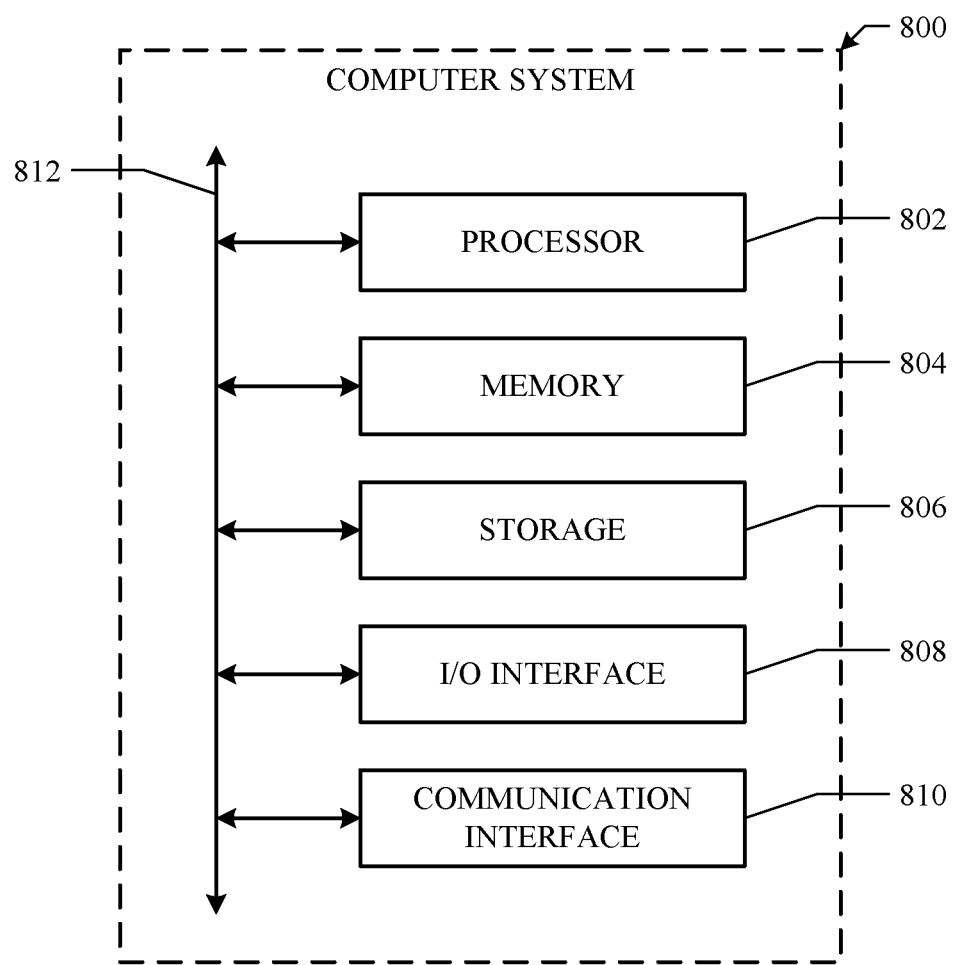
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
   receiving, from a first client system of a first user of an online social network, a search query for posts of the online social network, the search query comprising one or more query terms;
   retrieving, from one or more verticals of the online social network, a plurality of posts of the online social network, each retrieved post containing in the text of the post at least one of the one or more query terms, wherein each post is associated with a pre-calculated classifier vector comprising a plurality of classifier scores corresponding to a plurality of classifications, respectively, wherein each classifier score in a classifier vector associated with a post represents a degree of relevance of the post to the corresponding classifier;
   generating a reconstructed embedding of the query based on one or more term embeddings associated with the one or more query terms, respectively, wherein each of the one or more term embeddings corresponds to a point in a d-dimensional embedding space, and wherein the reconstructed embedding of the query is generated by pooling the one or more term embeddings associated with the one or more of the query terms, respectively;
formulating an evaluation model based at least on the reconstructed embedding of the query, wherein the evaluation model calculates a relevance score for posts with respect to the search query based at least on the classifier vectors of the posts;
calculating, for each of the retrieved posts, a relevance score for the post by applying the associated classifier vector to the formulated evaluation model;
ranking the retrieved posts based on their respective relevance scores; and
sending, to the first client system in response to the search query, instructions for generating a search-results interface for presentation to the first user, the search-results interface comprising references to one or more of the posts presented in ranked order.

2. The method of claim 1, wherein the pre-calculated classifier vector is created by analyzing the associated post using a natural-language processing algorithm.

3. The method of claim 1, further comprising:
receiving a request to post content from a second client system of a second user of the online social network;
calculating a classifier vector associated with the content by analyzing the content using a natural-language processing algorithm; and
storing the classifier vector as a part of document information of the content, wherein the content is stored as a post with a link to the document information.

4. The method of claim 1, further comprising:
detecting a signal to begin a batch calculation process;
searching the one or more verticals of the online social network to identify posts that have no associated classifier vector;
for each identified post:
calculating a classifier vector associated with the post by analyzing the post using a natural-language processing algorithm; and
storing the classifier vector as a part of document information of the post, wherein the post is stored with a link to the document information.

5. The method of claim 1, wherein the one or more term embeddings associated with the one or more query terms, respectively, are determined based on a deep-learning model.

6. The method of claim 1, wherein formulating the evaluation model comprises:
providing the reconstructed embedding as an input to an evaluation-model generating function; and
receiving the evaluation model from the evaluation-model generating function.

7. The method of claim 6, wherein the evaluation-model generating function is predetermined based on one or more experiments.

8. The method of claim 6, wherein the evaluation-model generating function generates an evaluation model based on a deep-learning model.

9. The method of claim 1, wherein the evaluation model comprises a mathematical function, the mathematical function comprising variables corresponding to the classifiers in the classifier vector, respectively.

10. The method of claim 9, wherein the mathematical function comprises a positive coefficient for a variable corresponding to a classifier in the classifier vector if the reconstructed embedding of the query indicates a positive correlation to the corresponding classifier, and wherein a magnitude of the positive coefficient represents a degree of significance of the corresponding classifier.

11. The method of claim 9, wherein the mathematical function comprises a negative coefficient for a variable corresponding to a classifier in the classifier vector if the reconstructed embedding of the query indicates a negative correlation to the corresponding classifier, and wherein a magnitude of the negative coefficient represents a degree of negative significance of the corresponding classifier.

12. The method of claim 9, wherein the mathematical function comprises a zero coefficient for a variable corresponding to a classifier in the classifier vector if the reconstructed embedding of the query indicates no correlation to the corresponding classifier.

13. The method of claim 1, wherein the evaluation model comprises one or more satisfying conditions, wherein each satisfying condition defines a satisfying range of a classifier score in a classifier vector for the associated post to be considered as a candidate post to be one of the search results.

14. The method of claim 13, further comprises filtering a post from a set of the retrieved posts if any classifier score in the classifier vector associated with the post does not satisfy any of the one or more satisfying conditions in the evaluation model.

15. A system comprising: one or more processors; and a non-transitory memory coupled to the processors comprising instructions executable by the processors, the processors operable when executing the instructions to:
receive, from a first client system of a first user of an online social network, a search query for posts of the online social network, the search query comprising one or more query terms;
retrieve, from one or more verticals of the online social network, a plurality of posts of the online social network, each retrieved post containing in the text of the post at least one of the one or more query terms, wherein each post is associated with a pre-calculated classifier vector comprising a plurality of classifier scores corresponding to a plurality of classifications, respectively, wherein each classifier score in a classifier vector associated with a post represents a degree of relevance of the post to the corresponding classifier;
generate a reconstructed embedding of the query based on one or more term embeddings associated with the one or more query terms, respectively, wherein each of the one or more term embeddings corresponds to a point in a d-dimensional embedding space, and wherein the reconstructed embedding of the query is generated by pooling the one or more term embeddings associated with the one or more of the query terms, respectively;
formulate an evaluation model based at least on the reconstructed embedding of the query, wherein the evaluation model calculates a relevance score for posts with respect to the search query based at least on the classifier vectors of the posts;
calculate, for each of the retrieved posts, a relevance score for the post by applying the associated classifier vector to the formulated evaluation model;
rank the retrieved posts based on their respective relevance scores; and
send, to the first client system in response to the search query, instructions for generating a search-results interface for presentation to the first user, the search-results interface comprising references to one or more of the posts presented in ranked order.

16. One or more computer-readable non-transitory storage media embodying software that is operable when executed to:
- receive, from a first client system of a first user of an online social network, a search query for posts of the online social network, the search query comprising one or more query terms;
- retrieve, from one or more verticals of the online social network, a plurality of posts of the online social network, each retrieved post containing in the text of the post at least one of the one or more query terms, wherein each post is associated with a pre-calculated classifier vector comprising a plurality of classifier scores corresponding to a plurality of classifications, respectively, wherein each classifier score in a classifier vector associated with a post represents a degree of relevance of the post to the corresponding classifier;
- generate a reconstructed embedding of the query based on one or more term embeddings associated with the one or more query terms, respectively, wherein each of the one or more term embeddings corresponds to a point in a d-dimensional embedding space, and wherein the reconstructed embedding of the query is generated by pooling the one or more term embeddings associated with the one or more of the query terms, respectively;
- formulate an evaluation model based at least on the reconstructed embedding of the query, wherein the evaluation model calculates a relevance score for posts with respect to the search query based at least on the classifier vectors of the posts;
- calculate, for each of the retrieved posts, a relevance score for the post by applying the associated classifier vector to the formulated evaluation model;
- rank the retrieved posts based on their respective relevance scores; and
- send, to the first client system in response to the search query, instructions for generating a search-results interface for presentation to the first user, the search-results interface comprising references to one or more of the posts presented in ranked order.

17. The media of claim 16, wherein the pre-calculated classifier vector is created by analyzing the associated post using a natural-language processing algorithm.

18. The media of claim 16, wherein the software is further operable when executed to:
- receive a request to post content from a second client system of a second user of the online social network;
- calculate a classifier vector associated with the content by analyzing the content using a natural-language processing algorithm; and
- store the classifier vector as a part of document information of the content, wherein the content is stored as a post with a link to the document information.

19. The media of claim 16, wherein the software is further operable when executed to:
- detect a signal to begin a batch calculation process;
- search the one or more verticals of the online social network to identify posts that have no associated classifier vector;
- for each identified post:
  - calculate a classifier vector associated with the post by analyzing the post using a natural-language processing algorithm; and
  - store the classifier vector as a part of document information of the post, wherein the post is stored with a link to the document information.

* * * * *